(12) United States Patent
Calvert

(10) Patent No.: US 8,765,050 B1
(45) Date of Patent: Jul. 1, 2014

(54) FLUID INJECTOR TO METAL ENCLOSURE

(71) Applicant: Fluid Injector Associates, Manassas, VA (US)

(72) Inventor: S. Mill Calvert, Manassas, VA (US)

(73) Assignee: Fluid injector Associates, Manassas, VA (US), Trustee for FIME CRT Trust ( * ) Notice: Subject to any disclaimer, the term of this patent is extended or adjusted under 35 U.S.C. 154(b) by 0 days.

(21) Appl. No.: 14/250,755

(22) Filed: Apr. 11, 2014

(51) Int. Cl.
*B23K 7/10* (2006.01)
*B23K 7/00* (2006.01)

(52) U.S. Cl.
CPC . *B23K 7/10* (2013.01); *B23K 7/002* (2013.01); *B23K 7/005* (2013.01)
USPC .......................................................... 266/77

(58) Field of Classification Search
CPC ............ B23K 7/00; B23K 7/002; B23K 7/10; B23K 7/0264; F23D 14/42
USPC ...................................... 266/48, 77; 239/304
See application file for complete search history.

(56) References Cited

U.S. PATENT DOCUMENTS

| | | | |
|---|---|---|---|
| 3,246,849 | A | 4/1966 | Aske |
| 3,388,901 | A | 6/1968 | Fergurson |
| 3,831,631 | A | 8/1974 | Draxler |
| 4,411,410 | A | 10/1983 | Sumner |
| 5,159,756 | A | 11/1992 | McGuire |
| 6,022,506 | A | 2/2000 | Simmons |
| 2010/0072682 | A1* | 3/2010 | Winfield, III et al. .......... 266/77 |

* cited by examiner

*Primary Examiner* — Scott Kastler
(74) *Attorney, Agent, or Firm* — Louis Ventre, Jr.

(57) ABSTRACT

A portable fluid injector is a device that burns through and injects a fluid into a metal enclosure. A miniature cutting torch mounted to a magnetic frame. The cutting torch has a minimum of three cylinders, two for cutting gases like oxygen and acetylene, and one for an injection fluid, such as a sleep-inducing gas. The device can be started remotely after it is attached to the metal enclosure. The miniature cutting torch has a nozzle mounted to the end of a pivot arm. An igniter or spark generator is activated to ignite the cutting gases. A guide tube extends below the nozzle such that the guide tube can progress into a hole cut below the nozzle. The guide tube may serve as a means to tell when the hole is complete. The guide tube may also convey the injection fluid through the hole.

9 Claims, 3 Drawing Sheets

FLUID INJECTOR TO METAL ENCLOSURE

TECHNICAL FIELD

In the field of cutting torches and gaseous injection technologies having valving means to control flow for each of diverse fluids, a device is disclosed that can burn through the metal skin of a containment vessel and inject a fluid.

BACKGROUND ART

Miniature and micro-torches are available as small as approximately ¾ inch in diameter and four inches in length and are used primarily for fine work on jewelry, in electronics, especially in micro-circuitry and tiny metal assemblies.

Portable torches that are clamped to pipes and other forms have been used to cut saddling holes in the sides of pipe, saddle seats in the ends of pipes, and to cut round holes in flat metal forms. Typically, such technology involves cutting toward the centerline of the pipe and results in a beveled surface at the pipe opening.

While portable hole-cutting devices are known, these are not system devices that perform more than hole cutting. The existing hole-cutting art typically involves significant effort to attach the hole-cutting device to the work piece and once attached only performs a hole-cutting job. Prior art does not show the structure or the functionality involved in combining hole-cutting with subsequent injection of a fluid into the hole.

SUMMARY OF INVENTION

A portable fluid injector is a device that burns through and injects a fluid into a metal enclosure. It includes a miniature cutting torch mounted to a magnetic frame. The cutting torch has a minimum of three cylinders, two for cutting gases like oxygen and acetylene, and one for an injection fluid, such as a sleep-inducing gas. The device can be started remotely after it is attached to the metal enclosure. The miniature cutting torch has a nozzle mounted to the end of a pivot arm. An igniter or spark generator is activated to ignite the cutting gases. A guide tube extends below the nozzle such that the guide tube can progress into a hole cut below the nozzle. The guide tube may serve as a means to tell when the hole is complete. The guide tube may also convey the injection fluid through the hole or this function may be served by the nozzle once the cutting gas flow is stopped. A limit switch automatically turns off the miniature cutting torch when the limit switch is engaged by rotation of the pivot arm to the limit switch. A magnet on the frame has sufficient magnetic force to hold the portable gaseous injector on a magnetic metal of the metal enclosure. Valves control release of the cutting gases and the injection fluid from the cylinders. A computer radio-frequency controller operably connects to the valves and the igniter. A battery provides power for operability. A sensor connected to the computer RF controller may be used to detect when the torch has burned through the magnetic metal. Such sensor includes a photoelectric device measuring reflected light from the hole and a load cell measuring compressive force on the guide tube. The pivot arm may be moved by a motor or a spring.

Technical Problem

Many times when there is a need to cut a hole with a cutting torch, it is not safe or practical to try and do the job with the typical heavy and bulky oxygen/acetylene tanks and equipment that most welders and workers use. The area where the hole needs to be cut through may be too dangerous to try and place a man there to do the work, or it could be in a very confined space where normal cutting equipment will not fit. It may be also in a very difficult location that would make trying to get the cutting equipment there cost prohibited or impracticable or dangerous.

Solution to Problem

The answer to these and other similar problems has been solved with the invention of the fluid injector to metal enclosure. The fluid injector to metal enclosure is a small, compact device that will magnetically stick onto a metal surface and will cut a clean hole. After the hole has been cut through, the fluid injector to metal enclosure can, under pressure, inject a solution into the newly cut hole. The solution that is injected into the hole may be any type. It could be a fire retardant solution, a cooling solution, a sealing solution, a rust inhibitor paint or solution, or any type of solution that can be injected into the hole under pressure.

The fluid injector to metal enclosure has a remote control for operation at a distance. The fluid injector to metal enclosure can be operated manually or by a timer. Inside of the fluid injector to metal enclosure, are at least three tanks: an oxygen tank, an acetylene tank, and a third tank to contain the injectable fluid under pressure. The oxygen and acetylene tanks may contain different cutting gases, if desired. A spring loaded pivoting cutting torch head contains a nozzle or tube to inject the third tank solution into the cut through hole.

The fluid injector to metal enclosure is computer-controlled to ignite the torch, open or shut the valves to the tanks and when the hole has been fully cut through to inject the fluid in the third tank.

Advantageous Effects of Invention

The fluid injector to metal enclosure will now provide the ability to easily cut a hole where it may have been too costly, dangerous, or impossible to do the job before, and the injectability feature in the third bottle will now provide many useful options to accomplish specific tasks and jobs.

The fluid injector to metal enclosure will now make easy remote control hole cutting and injectability a very useful tool for many different situations.

BRIEF DESCRIPTION OF DRAWINGS

The drawings illustrate preferred embodiments of the fluid injector to metal enclosure according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
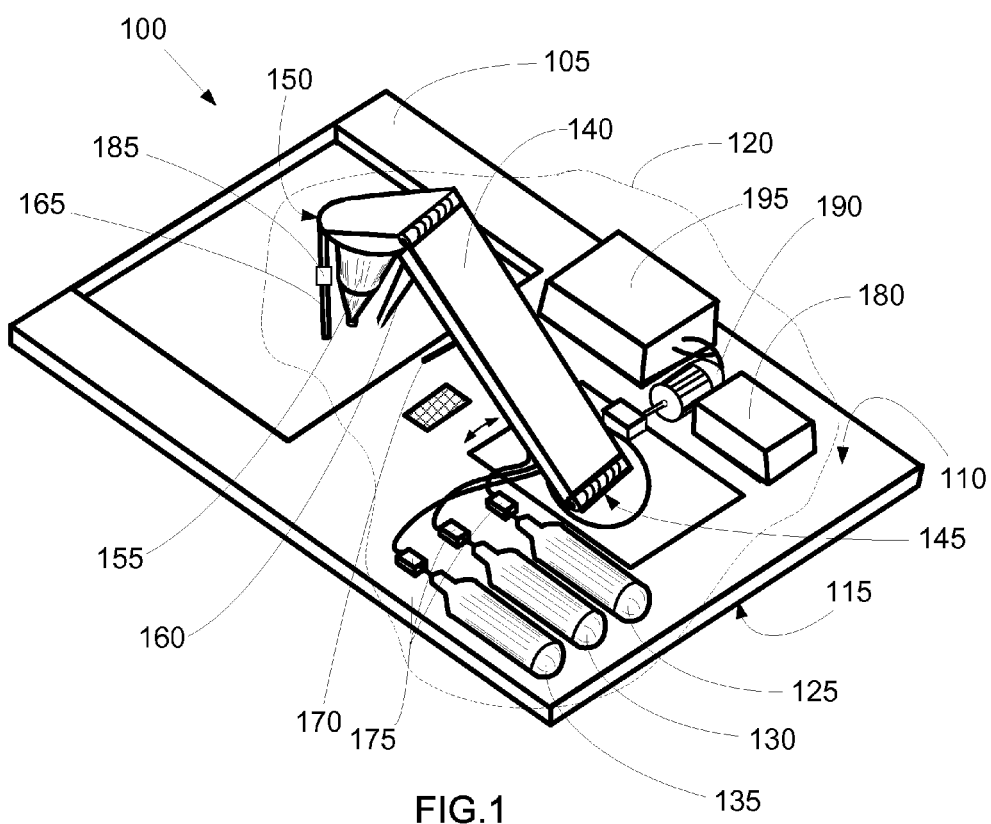
FIG. 1 is a perspective view of a fluid injector to metal enclosure.
Figure 5:
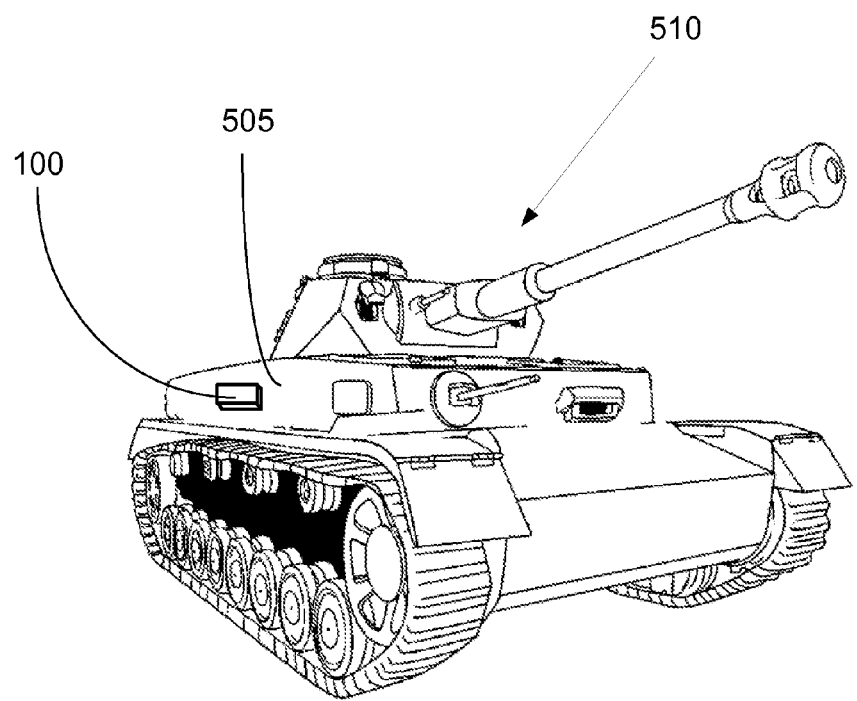
FIG. 5 is a perspective view of the fluid injector to metal enclosure magnetically attached to magnetic metal formed in the shape of a tank.

FIG. 1 is a perspective view of a fluid injector to metal enclosure. The fluid injector to metal enclosure is also referred to herein as a portable gaseous injector (100). The metal enclosure (510) may be any enclosed structure that is made of a material attracted to a magnet. FIG. 5 illustrates a tank as a metal enclosure (510). It is made of a magnetic metal (505), steel.

The portable gaseous injector (100) to metal enclosure includes: a frame (105); a miniature cutting torch (120); a first cylinder (125); a second cylinder (130) and a third cylinder (135); a pivot arm (140); a nozzle (155); an igniter (160); a guide tube (165); a limit switch (170); a magnet (205); valves (175); a computer radio-frequency controller (180) and optionally a sensor (185); a motor (190); and a spring (210).

The frame (105) is any mounting structure, which may be a flat plate or a box. Preferably there is an opening in the frame (105) for the flame to extend from the nozzle (155) and out past the frame (105) so as to be able to burn the metal enclosure to which it is attached. If the frame (105) is a closed box with no opening, then the flame from the nozzle (155) would first burn through the box and then engage the metal enclosure.

Figure 4:
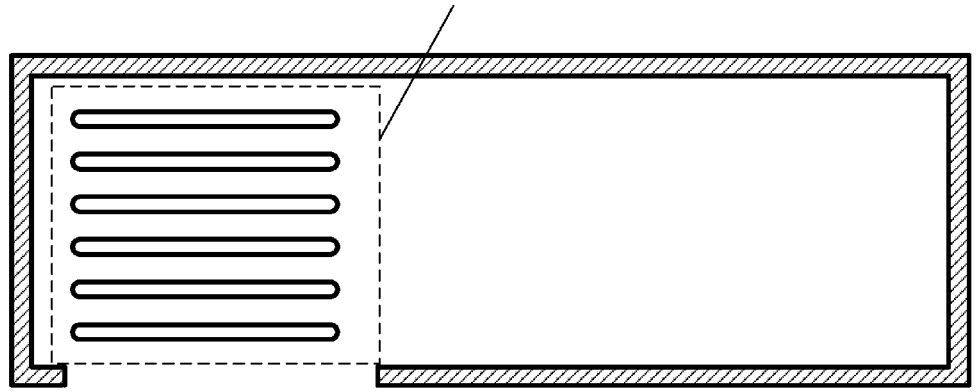
FIG. 4 is a side elevation view of the embodiment of FIG. 2 showing air vents.

The frame (105) at least has a top surface (110) on which to mount the components of the portable gaseous injector (100). When the frame (105) is a box, the components may be mounted on any inside wall of the box. Air vents (405), as shown in FIG. 4, are preferable to prevent overheating inside the box. The frame (105) has a bottom surface (115), preferably a bottom-planar surface, which includes a magnet (205). The magnet (205) is present so that the frame (105) can be magnetically attached to a metal enclosure which is made of magnetic metal (505). Examples of a magnetic metal (505) include iron, nickel, cobalt, gadolinium, and alloys thereof. Once attached on the metal enclosure, the portable gaseous injector (100) is operable to cut a hole through a wall of the metal enclosure, and then inject a fluid into the metal enclosure.

The miniature cutting torch (120) is mounted to the frame (105). It is miniature in the sense that it can be carried and deployed by a human being. A preferable size is in a range of about 4 to 18 inches. A preferable weight for the portable gaseous injector (100) is in a range of about 1 to 20 pounds.

When the frame (105) includes only a top surface (110) and a bottom surface (115), the miniature cutting torch (120) is mounted to the top surface (110), leaving the bottom surface (115) free for attachment to the metal enclosure. When the frame (105) is a box, the miniature cutting torch (120) may be mounted to any inside wall of the box.

The miniature cutting torch (120) includes the first cylinder (125) of oxygen and a second cylinder (130) of a gaseous, combustible aliphatic hydrocarbon, preferably acetylene, and a third cylinder (135) of an injection fluid mounted to the frame (105). When the frame (105) includes only a top surface (110) and a bottom surface (115), the first cylinder (125), second cylinder (130) and third cylinder (135) are mounted to the top surface (110). When the frame (105) is a box, the first cylinder (125), second cylinder (130) and third cylinder (135) may be mounted to any inside wall of the box.

The fluid in the third cylinder (135) may be any gas, liquid or fluidized solid particulants. For military or police uses, the fluid in the third cylinder (135) may be a sleep inducing gas, an acid, an explosive such as methane, potassium perchlorate and aluminium powder, or something lethal when inhaled such as chlorine. For civilian uses, the fluid in the third cylinder (135) may be a fire retardant solution, a cooling solution, a sealing solution, an expanding insulating foam, a rust inhibitor paint or solution.

The miniature cutting torch (120), shown within the dashed enclosure of FIG. 1, includes the pivot arm (140) rotationally connected with respect to the frame (105). When the frame (105) includes only a top surface (110) and a bottom surface (115), the pivot arm (140) is rotationally connected with respect to the top surface (110), so that it can pivot downward to burn through the metal enclosure.

The pivot arm (140) has a rotating end (145) that rotates about a joint. This arrangement enables the pivot arm (140) to pivot towards and away from the metal enclosure during operation. The pivot arm (140) also has a nozzle end (150), where the nozzle (155) is attached so that it can rotate towards the metal enclosure and burn the hole.

Figure 3:
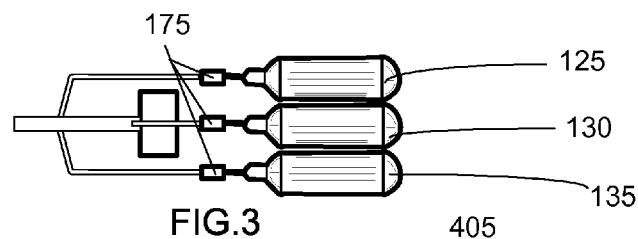
FIG. 3 is a top view of three gaseous bottles and valves piped together.

The nozzle (155) is supplied with oxygen from the first cylinder and the gaseous, combustible aliphatic hydrocarbon, preferably acetylene, from the second cylinder (130). The fluid from the third cylinder (135) may also be supplied to the nozzle (155) in an arrangement as shown in FIG. 3. Alternatively, the third cylinder (135) may supply the guide tube (165), which necessarily provides a fluid exit closer to the inside of the metal enclosure once the hole is cut through the metal enclosure. The nozzle (155) is connected to the nozzle end (150) of the pivot arm (140) and thus it pivots toward the metal enclosure when the pivot arm (140) is operationally rotated.

The igniter (160) is a simple sparking mechanism that enables ignition of oxygen and gaseous, combustible aliphatic hydrocarbon to start the miniature cutting torch (120). It is preferably powered by a battery (195).

The guide tube (165) extends from the pivot arm (140) to a position below the nozzle (155) such that the guide tube (165) can progress into a hole cut below the nozzle (155). The guide tube (165) is preferably made of a material that melts at a high temperature so that exposure to heat near the burning gases from the nozzle does not cause the guide tube (165) to fail. Such material is preferably a refractory metal or a ceramic material. In some embodiments, the guide tube (165) is supplied with the injection fluid from the third cylinder (135). In other embodiments, the guide tube (165) is simply a rod that helps in determining when the miniature cutting torch (120) has completed burning a hole in the metal enclosure.

The limit switch (170) automatically turns off the miniature cutting torch (120) when the limit switch (170) is engaged by rotation of the pivot arm (140) to the limit switch (170). The limit switch (170) operates as an automatic cut-off switch that stops the operation of the miniature cutting torch (120) when the pivot arm (140) pivots to the desired maximum rotational position.

The magnet (205) is positioned on the frame (105) to provide sufficient magnetic force to hold the portable gaseous injector (100) on a magnetic metal (505). When the frame (105) includes only a top surface (110) and a bottom surface (115), the magnet (205) is positioned on the bottom surface of the frame (105). When the frame (105) is a box, the magnet (205) is positioned on any inner wall of the box that is intended to attach to the metal enclosure to be penetrated.

The valves (175) control the release of oxygen from the first cylinder, the gaseous, combustible aliphatic hydrogen from the second cylinder (130); and the injection fluid from the third cylinder (135). There is preferably one valve for each cylinder in the miniature cutting torch (120).

Figure 2:
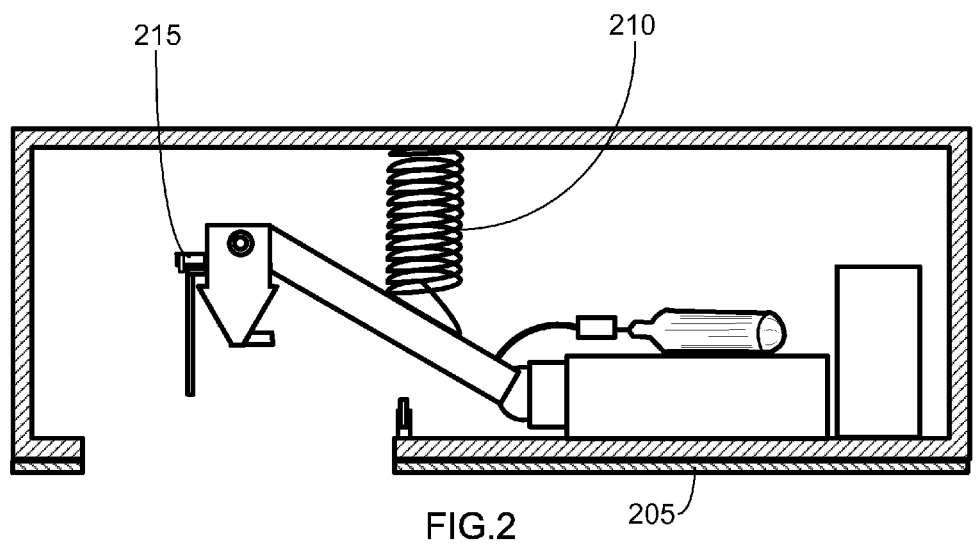
FIG. 2 is a side sectional view of an alternative embodiment of the fluid injector to metal enclosure.
Figure 6:
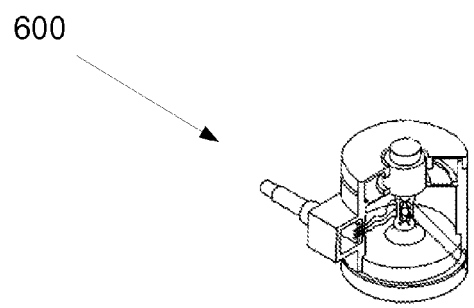
FIG. 6 is a cutaway perspective of a load cell.

The portable gaseous injector (100) may include a sensor (185) to detect when the torch has burned through the magnetic metal (505). The sensor (185) is operably connected to the computer radio-frequency controller (180) to enable the computer radio-frequency controller (180) to turn off the miniature cutting torch (120) when the hole through the metal enclosure is made. Examples of a sensor operable in this environment include a photoelectric device (215) in FIG. 2 that measures reflected light from the hole and a load cell (600) in FIG. 6 that measures compressive force on the guide tube (165). A load cell typically employs a transducer that converts an input mechanical force into an electrical output signal.

The portable gaseous injector (100) may include a motor (190) operably connected to the pivot arm (140) to rotate it via a geared mechanism. The motor (190) is powered by the battery (195) and controlled by the computer radio-frequency controller (180).

Alternatively, the pivot arm (140) is rotated by a spring (210) connected between a wall of the frame (105) and the pivot arm (140). The spring (210) is operable to bias rotation of the pivot arm (140) toward the limit switch (170) and is resisted in downward movement by the guide tube (165) into the hole. The spring (210) moves the pivot arm (140) toward the metal enclosure as the guide tube (165) moves into the hole being burned by the miniature cutting torch (120).

The computer radio-frequency controller (180) is operably connected to the valves (175) and the igniter (160) to control their operation. The battery (195) supplies power to operate the computer radio-frequency controller (180). When a radio-frequency signal is received by the computer radio-frequency controller (180): the valves to the first cylinder and the second cylinder are opened to flow oxygen and the gaseous, combustible aliphatic hydrocarbon to the nozzle (155); the igniter (160) is started to light the gases exiting from the nozzle (155) in the miniature cutting torch (120); the pivot arm (140) begins rotation toward the metal enclosure to burn the hole; sensor feedback when sensors are present is used to turn off the open valves when the hole is burned through the metal enclosure; or if the limit switch is activated, to turn off the open valves when the rotational limit is met; the valve to the third cylinder (135) is then opened to permit the fluid in the third cylinder (135) to flow into the metal enclosure through the hole cut by the miniature cutting torch (120).

An alternative embodiment may be used for non-magnetic metallic enclosures. For this embodiment, the portable gaseous injector includes a glue instead of a magnet. Preferably, the glue is engaged by stripping off a cover sheet, like in a mailing envelope, and then immediately pressing it against the enclosure. The glue on the frame provides sufficient sticking force to hold the portable gaseous injector on the enclosure.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the piping industry, the metal working industry and the weapons manufacturing industry.

What is claimed is:

1. A portable fluid injector to metal enclosure comprising:
   a frame;
   a miniature cutting torch mounted to the frame, the miniature cutting torch comprising a first cylinder of oxygen and a second cylinder of a gaseous, combustible aliphatic hydrocarbon;
   a third cylinder of an injection fluid mounted to the frame;
   the miniature cutting torch further comprising:
      a pivot arm rotationally connected with respect to the frame, the pivot arm comprising a rotating end and a nozzle end;
      a nozzle supplied with oxygen from the first cylinder and with the gaseous combustible aliphatic hydrocarbon from the second cylinder, the nozzle connected to the nozzle end of the pivot arm;
      an igniter; and
      a guide tube extending from the pivot arm to a position below the nozzle such that the guide tube can progress into a hole cut below the nozzle;
   a limit switch that automatically turns off the miniature cutting torch when the limit switch is engaged by rotation of the pivot arm to the limit switch;
   a magnet on the frame so as to provide sufficient magnetic force to hold the portable gaseous injector on a magnetic metal;
   valves controlling release of oxygen from the first cylinder, the gaseous, combustible aliphatic hydrogen from the second cylinder; and the injection fluid from the third cylinder; and
   a computer radio-frequency controller operably connected to the valves and the igniter.

2. The portable gaseous injector of claim 1, wherein the guide tube is supplied with the injection fluid from the third cylinder.

3. The portable gaseous injector of claim 1, further comprising a sensor to detect when the torch has burned through the magnetic metal, the sensor operably connected to the computer radio-frequency controller.

4. The portable gaseous injector of claim 3, wherein the sensor comprises a photoelectric device measuring reflected light from the hole.

5. The portable gaseous injector of claim 3, wherein the sensor comprises a load cell measuring compressive force on the guide tube.

6. The portable gaseous injector of claim 1, further comprising a motor operably connected to the pivot arm, the motor controlled by the computer RF controller.

7. The portable gaseous injector of claim 1, further comprising a spring connected to the pivot arm and operable bias rotation of the pivot arm toward the limit switch.

8. The portable gaseous injector of claim 1, wherein the magnetic metal comprises iron, nickel, cobalt, gadolinium, and alloys thereof.

9. A portable fluid injector to an enclosure comprising:
   a frame;
   a miniature cutting torch mounted to the frame, the miniature cutting torch comprising a first cylinder of oxygen and a second cylinder of a gaseous, combustible aliphatic hydrocarbon;
   a third cylinder of an injection fluid mounted to the frame;
   the miniature cutting torch further comprising:
      a pivot arm rotationally connected with respect to the frame, the pivot arm comprising a rotating end and a nozzle end;
      a nozzle supplied with oxygen from the first cylinder and with the gaseous combustible aliphatic hydrocarbon from the second cylinder, the nozzle connected to the nozzle end of the pivot arm;

an igniter; and a guide tube extending from the pivot arm to a position below the nozzle such that the guide tube can progress into a hole cut below the nozzle;

a limit switch that automatically turns off the miniature cutting torch when the limit switch is engaged by rotation of the pivot arm to the limit switch;

a glue on the frame so as to provide sufficient sticking force to hold the portable gaseous injector on the enclosure;

valves controlling release of oxygen from the first cylinder, the gaseous, combustible aliphatic hydrogen from the second cylinder; and the injection fluid from the third cylinder; and a computer radio-frequency controller operably connected to the valves and the igniter.

\* \* \* \* \*